United States Patent Office 2,940,958
Patented June 14, 1960

2,940,958
CURING POLYSULFIDE POLYMER WITH CHROMATES AND HYDROUS SALTS

Daniel J. Smith, Elkton, Md., assignor to Thiokol Chemical Corporation, Trenton, N.J., a corporation of Delaware No Drawing. Filed July 6, 1956, Ser. No. 596,145

6 Claims. (Cl. 260—79.1)

This invention relates to curing compositions for liquid polymers that can be further polymerized by an oxidizing agent in the presence of water. More particularly, it relates to curing compositions which are potential in the sense that they can be admixed with a liquid polymer without effecting a cure until the admixture is subjected to higher than ambient temperatures. The invention is also directed to mixtures of liquid polymer, especially liquid polysulfides, with such potential curing compositions and to a method of curing liquid polymers.

In the art relating to polysulfide polymers, for example, the invention represents a considerable advance in that it provides a combination of liquid polysulfide with a built-in curing composition. This combination is stable and liquid at ordinary temperatures and is therefore storable for indefinite periods of time without undergoing any significant change in physical or chemical characteristics. It can, however, be transformed into a tough, resilient and chemically stable cross-linked polymer simply by heating it to an elevated temperature that need not be higher than about 220° F. The invention makes available a single liquid product that does not require the addition thereto by the user of any curing or other components and therefore has the additional incidental advantage of eliminating errors on the part of the user with reference to the type and quantity of curing agent to be added.

The potential curing composition of the invention comprises a water-activatable oxidizing agent and hydrous salt. The water-activatable oxidizing agent may be a metal peroxide or a chromate. Ammonium dichromate, potassium dichromate, potassium chromate and sodium chromate are among the chromates that are particularly outstanding in their effectiveness and are therefore preferred. Other chromates, such as ammonium chromate, magnesium chromate and sodium dichromate are also effective. The hydrous salt component of the curing composition should be stable at ambient temperatures and be capable of releasing water of hydration at temperatures between about 100 and 220° F. Such salts as sodium tetraborate $Na_2B_4O_7.10H_2O$, and calcium ferrocyanide $Ca_2Fe(CN)_6.12H_2O$, are outstanding and others such as cobaltous chloride $CoCl_2.6H_2O$, ammonium biborate $NH_4H_2BO_3.\frac{1}{2}H_2O$, chromium chloride $CrCl_3.6H_2O$, barium chloride $BaCl_2.2H_2O$, calcium phosphate $Ca(H_2PO_4)_2.H_2O$ and ammonium tungstate $$(NH_4)_6W_7O_{24}.6H_2O$$

are operable but somewhat less effective. Hydrous chromates such as sodium chromate $Na_2CrO_4.4H_2O$, are particularly advantageous curing materials because they combine the functions of a water-activatable curing agent and salt capable of releasing water of hydration at elevated temperature.

The relative proportions of oxidizing agent to hydrous salt will, as understood by those skilled in the art, vary with the facility with which the particular oxidizing agent is activatable in the presence of water at the temperature of water release and with ability of the hydrous salt to release water. Generally, ratios of about 1:1 to about 4:1 by weight have been found most effective.

The liquid polysulfides that are particularly adapted for curing in accordance with the invention generally include the linear polymers, cross-linked polymers and copolymers thereof having molecular weights within the range of about 500 to 12,000. The linear polymers comprise series of units having the general formula —SRS— linked together to form a polymer by synthesis or cleavage of higher molecular weight polymers in which S stands for sulfur and R stands for a radical having structure selected from the group consisting of

designating a single carbon atom,

designating two adjacent carbon atoms, and

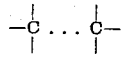

designating two carbon atoms joined to and separated by intervening structure. The cross-linked polymers, having a space lattice structure, are polymers of the unit

in which R is a radical having structure selected from the group consisting of

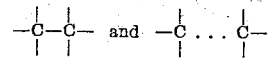

having the same designations as before.

While the proportions by weight of potential curing composition to polysulfide may also vary, depending upon the reactivity of the polysulfide, the relative effectiveness of the curing composition, the temperature to be employed and the results desired, it is generally desirable, for consistently reliable results, to operate within the range of about 1.25 to about three parts curing composition to ten parts polysulfide.

The utility and other advantages of the invention, as well as the relative efficacy of various materials as components of the curing composition, will become more apparent from the following examples included to illustrate the preferred modes of carrying out the invention.

EXAMPLE 1

Samples of two representative liquid polysulfides were each admixed with preselected proportions by weight of ammonium dichromate and sodium tetraborate. The admixed samples were tested for storability at room temperature and for effectiveness of cure at temperatures of 140° F. and 220° F. One of the polysulfide samples (sample A) had an average structure represented by the formula:

$$HS(C_2H_4OCH_2OC_2H_4SS)_{23}-C_2H_4OCH_2OC_2H_4SH$$

occasionally having a side mercaptan group in the chain or recurring units. The other (sample B) had the average structure represented by the formula $$HS(C_2H_4OCH_2OC_2H_4SS)_6-C_2H_4OCH_2OC_2H_4SH$$

These polysulfide samples are thus of a class which are essentially polythiopolymercaptan polymers, that is, polymers having as recurrent units saturated aliphatic oxahydrocarbon radicals interconnected by polysulfide groups.

The conditions and results of these tests are summarized in Table I immediately below:

Table I

| Sample A, parts by weight | 100 | 100 | 100 | 100 |
|---|---|---|---|---|
| Sample B, parts by weight | | | | |
| (NH₄)₂Cr₂O₇ | 10 | | 10 | 20 |
| Na₂CrO₄.4H₂O | | 15 | | |
| Na₂B₄O₇.10H₂O | | | 3 | 5 |
| Remarks: | | | | |
| 48 hrs. at room temp | No cure | No cure | No cure | No cure |
| 24 hrs. at 140° F | do | Cured | Cured | Cured |
| 24 hrs. at 220° F | do | do | do | Do |

These data indicate that both liquid polysulfides remain uncured at room temperature with and without the presence of hydrous salt and that the polysulfides containing ammonium dichromate and sodium tetraborate are cured by being subjected to temperature of 140° F. or more for twenty-four hours. These data also indicate the remarkable ability of hydrous sodium chromate to perform the functions of both the water-activatable curing agent and of the water-releasing hydrous salt.

EXAMPLE 2

In order to compare the effectiveness of several representative chromates as curing agents, ten parts thereof were admixed with 100 parts of the liquid polysulfide identified as sample A in Example 1 and with three parts by weight of sodium tetraborate. These samples were then subjected to the same tests as in Example 1. The results are indicated in Table II immediately below:

Table II

| Chromate | 48 hrs. at room temp. | 24 hrs. at 140° F. | 24 hrs. at 220° F. |
|---|---|---|---|
| (NH₄)₂Cr₂O₇ | No cure | Cured | Cured. |
| (NH₄)₂CrO₄ | do | Soft cured | Soft cured. |
| K₂Cr₂O₇ | do | Cured | Cured. |
| K₂CrO₄ | do | do | Do. |
| Mg₂Cr₂O₇ | do | Soft cured | Do. |
| Na₂Cr₂O₇ | do | do | Slightly soft cured. |
| Na₂CrO₄ | do | Cured | Cured. |

EXAMPLE 3

To evaluate various hydrous salts, 100 parts by weight of the liquid polysulfide identified as sample A in Example 1 and ten parts by weight of ammonium dichromate were admixed with five or ten parts by weight of hydrous salt and subjected to the same tests as described in Examples 1 and 2. The hydrous salts utilized, the amount thereof and the results are indicated in Table III immediately below:

Table III

| Hydrous Salt | Amount, parts by wt. | 48 hrs. at room temp. | 24 hrs. at 140° F. | 24 hrs. at 220° F. |
|---|---|---|---|---|
| Na₂B₄O₇.10H₂O | 3 | No cure | Cured | Cured. |
| CoCl₂.6H₂O | 5 | do | Soft cure | Spongy cure. |
| CrCl₃.6H₂O | 5 | do | Liquid increased in viscosity. | Soft cure with possible reversion starting. |
| NH₄HB₄O₇.3H₂O | 10 | do | do | Cured, tacky surface. |
| CaH₄(PO₄)₂.1H₂O | 10 | do | Soft cure | Reverted. |
| BaCl₂.2H₂O | 10 | do | No cure | Cured, tacky surface. |
| (NH₄)MO₇O₂₄.12H₂O | 10 | do | Increased in viscosity. | Do. |
| (NH₄)₆W₇O₂₄.6H₂O | 10 | do | No cure | Do. |
| Ca₂(Fe(CN)₆).12H₂O | 10 | do | Cured | Cured. |

These data indicate that with ammonium dichromate as the curing agent, such hydrous salts as sodium tetraborate and calcium ferrocyanide are optimum and that the other hydrous salts tested are operable but of lesser effectiveness. By increasing the amount of ammonium dichromate to twenty parts by weight, it was found that with five parts by weight of cobaltous chloride a complete cure could be effected after twenty-four hours at 140° F. and that with ten parts ammonium biborate a complete cure could be effected after twenty-four hours at 220° F.

EXAMPLE 4

To evaluate the rapidity of cure with various additives, portions of the liquid polysulfide identified as sample A in Example 1 were admixed with ammonium dichromate or sodium chromate and sodium tetraborate and heated to 158° F. until cured. The additives or combinations thereof utilized, the proportions by weight and the curing times are indicated in Table IV immediately below

Table IV

| Sample A, parts by weight | 100 | 100 | 100 | 100 | 100 |
|---|---|---|---|---|---|
| (NH₄)₂Cr₂O₇ | 10 | 20 | | | |
| Na₂CrO₄.4H₂O | | | 10 | 20 | 20 |
| Na₂B₄O₇.10H₂O | 5 | 5 | | | 5 |
| Cure Time at 158° F., hrs | 4 | 3 | 1 | 1 | 1 |

The data in Table IV indicate that comparatively short curing times are possible in accordance with the invention, particularly with sodium chromate functioning as both a water-activatable curing agent and as a salt capable of releasing water of hydration.

It is apparent that various modifications will readily become apparent to those skilled in the art upon reading this description. All such modifications are intended to be included within the scope of the invention as defined in the accompanying claims.

I claim:

1. Method for polymerizing a substantially anhydrous liquid polythiopolymercaptan polymer composed of —SS— units linked by members of the group consisting of divalent hydrocarbon, oxahydrocarbon and thiahydrocarbon groups in a linear chain which comprises heating an admixture thereof with $Na_2CrO_4.4H_2O$ to a temperature within the range of about 100° F. to 220° F.

2. Method for polymerizing a substantially anhydrous liquid polythiopolymercaptan polymer composed of —SS— units linked by members of the group consisting of divalent hydrocarbon, oxahydrocarbon and thiahydrocarbon groups in a linear chain which comprises heating an admixture thereof with a chromate from the group consisting of ammonium, potassium, sodium and magnesium chromates and dichromates and with a hydrous salt selected from the group consisting of sodium tetraborate, ammonium biborate, cobaltous chloride, chromium chloride, barium chloride, calcium phosphate, ammonium tungstate and calcium ferrocyanide to a temperature within the range of about 100° F. to about 200° F.

3. Method for polymerizing a substantially anhydrous liquid polysulfide composed of —SS— units linked by members of the group consisting of divalent hydrocarbon, oxahydrocarbon and thiahydrocarbon groups in a linear chain which comprises heating the polysulfide to a temperature within the range of about 100 to 220° F. while in admixture with a chromate and a hydrous salt selected from the group consisting of sodium tetraborate, ammonium biborate, cobaltous chloride, chromium chloride, barium chloride, calcium phosphate, ammonium tungstate and calcium ferrocyanide.

4. Composition consisting essentially of a liquid, polymerizable, substantially anhydrous polythiopolymercaptan polymer composed of —SS— units linked by members of the group consisting of divalent hydrocarbon, oxahydrocarbon and thiahydrocarbon groups in a linear chain and containing between about 1.25 and about three parts by weight, per ten parts polythiopolymercaptan of $Na_2CrO_4.4H_2O$.

5. Composition consisting essentially of a liquid, polymerizable, substantialy anhydrous polythiopolymercaptan polymer composed of —SS— units linked by members of the group consisting of divalent hydrocarbon, oxahydrocarbon and thiahydrocarbon groups in a linear chain and containing between about 1.25 and about three parts by weight, per ten parts polythiopolymercaptan, of a curing composition comprising a chromate and a hydrous salt selected from the group consisting of sodium tetraborate, ammonium biborate, cobaltous chloride, chromium chloride, barium chloride, calcium phosphate, ammonium tungstate and calcium ferrocyanide.

6. Composition consisting essentially of a liquid, polymerizable, substantially anhydrous polythiopolymercaptan polymer composed of —SS— units linked by members of the group consisting of divalent hydrocarbon, oxahydrocarbon and thiahydrocarbon groups in a linear chain and containing between about 1.25 and about three parts by weight, per ten parts polythiopolymercaptan, of a curing composition comprising a chromate and a hydrous salt selected from the group consisting of sodium tetraborate, ammonium biborate, cobaltous chloride, chromium chloride, barium chloride, calcium phosphate, ammonium tungstate and calcium ferrocyanide, the ratio by weight of said chromate and said hydrous salt in the composition being about 1:1 to about 4:1.

References Cited in the file of this patent

UNITED STATES PATENTS

| | | |
|---|---|---|
| 2,466,963 | Patrick | Apr. 12, 1949 |
| 2,588,796 | Benignus | Mar. 11, 1952 |
| 2,787,608 | Gregory et al. | Apr. 2, 1957 |

OTHER REFERENCES

Partington: "A Textbook of Inorganic Chemistry," 6th ed., page 202, Macmillan, 1953.